United States Patent
Raz et al.

(10) Patent No.: US 8,702,250 B2
(45) Date of Patent: Apr. 22, 2014

(54) SYSTEM AND METHOD FOR ADJUSTING VEHICLE MIRRORS AUTOMATICALLY BASED ON DRIVER HEAD POSITION

(75) Inventors: Guy Raz, Rehovot (IL); Ran Y Gazit, Ra'anana (IL)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 13/437,113

(22) Filed: Apr. 2, 2012

(65) Prior Publication Data

US 2013/0258512 A1 Oct. 3, 2013

(51) Int. Cl.
*G02B 5/08* (2006.01)

(52) U.S. Cl.
USPC .......................................................... 359/843

(58) Field of Classification Search
USPC ........................... 359/843, 850, 854, 871, 872
See application file for complete search history.

(56) References Cited

U.S. PATENT DOCUMENTS

| 8,087,791 B2 * | 1/2012 | Okuda et al. | 359/843 |
| 2008/0239527 A1 * | 10/2008 | Okabe et al. | 359/843 |
| 2011/0122520 A1 * | 5/2011 | Verheyden | 359/843 |

* cited by examiner

*Primary Examiner* — Frank Font
(74) *Attorney, Agent, or Firm* — Parks IP Law LLC; Mickki D. Murray, Esq.

(57) ABSTRACT

An automatically adjusting mirror system including a mirror assembly, a head position sensor configured and arranged to detect a pose of a head of a driver of a vehicle, and a master controller in communication with the mirror assembly and head position sensor. The master controller is configured to receive input from the mirror assembly and head position sensor, and adjust the mirror assembly based on the input from the mirror assembly and the input from the head position sensor to maintain a line of sight for the driver.

21 Claims, 6 Drawing Sheets

SYSTEM AND METHOD FOR ADJUSTING VEHICLE MIRRORS AUTOMATICALLY BASED ON DRIVER HEAD POSITION

I. FIELD OF THE DISCLOSURE

The present disclosure relates to a system and method for automatically adjusting automobile mirrors based on the head position of the driver. More particularly, the present disclosure relates to a system and method that automatically adjusts the central (rear view) and side view mirrors of an automobile according to the head position of the driver.

II. BACKGROUND OF THE DISCLOSURE

It is well known in the art to provide a rear vision system for a vehicle such as a motor vehicle. Typically, the rear vision system includes a pair of outside or exterior side view mirrors, one on both driver and passenger sides of the vehicle, and an inside or interior rearview mirror in an occupant compartment of the vehicle.

Such a rear vision system may be power operated to allow a driver to adjust the side and interior rearview mirrors without physically attending them. These mirrors are typically adjustable both vertically (up/down or elevation) and horizontally (left/right or azimuth), using electronic motors controlled by the driver via a mirror position switch.

Usually, a single mirror position switch assembly is used, which includes a four-way rocker or joystick type switch for directing the two-directional movement of the mirrors as well as the left/right selector switch that switches between the two exterior side rearview mirrors so that they can be adjusted one at a time, independently of each other. The selector switch may also include a locked position so that movement of the joystick does not activate either of the mirror motors.

On vehicles provided with memory positioning, the mirrors can be automatically moved by suitable vehicle circuitry to a preset position established by the driver. Such circuitry can be implemented using position sensors on the mirrors to determine the instantaneous position of the mirrors in both the horizontal and vertical directions. These types of mirror positioning circuits are well known.

It is also well known to automatically adjust a rear vision system for a vehicle. For example, it is known to utilize adjustments by a vehicle operator to a driver side mirror to make automatic adjustments to a passenger side mirror without requiring the operator to make separate independent adjustment of the mirror. The automatic adjustment may be determined using a measured horizontal angle of the driver side mirror along with distance data related to a position of an inboard edge of each of the exterior side mirrors based on a popular setting method, such as a Blindzone setting method. It is also known to provide a synchronized rear vision system for a vehicle that allows a driver to use the Blindzone/Glare Elimination setting method. Such a system may include an automatic setting method detection and selection that allows a driver to use either the Blindzone or Glare Elimination setting method to adjust all mirrors of the rear vision system by adjusting the driver side mirror.

While the known systems are useful, there remains a need for a system and method that provides automatic, hands-free mirror adjustment in response to changes in the head position of the driver. There also remains a need for a system and method that provides enhanced safety by minimizing improper mirror positioning while maintaining the driver field of view. Therefore, it is desirable to provide a system and method for automatically adjusting vehicle mirrors based on the position of the head of the driver.

III. SUMMARY OF THE DISCLOSURE

In at least one aspect, the present disclosure describes an automatically-adjusting mirror system including a mirror assembly; a head position sensor configured and arranged to detect a pose of a head of a driver of a vehicle; and a master controller in communication with the mirror assembly and the head position sensor, wherein the master controller is configured to receive input from the mirror assembly; receive input from the head position sensor; and adjust the mirror assembly based on the input from the mirror assembly and the input from the head position sensor to maintain a line of sight for the driver.

In at least another aspect, the present disclosure describes a method, for adjusting components of a mirror system automatically, including receiving input from a mirror assembly, wherein the input includes information indicating an angle of a mirror of the mirror assembly; receiving input from a head position sensor, wherein the input indicates a position of a head of a driver; and adjusting the mirror assembly, based on the input from the head position sensor and the input from the mirror assembly, to maintain a line of sight for the driver.

In at least another aspect, the present disclosure describes a non-transitory computer-readable medium having stored thereon computer-executable instructions that, when executed by a processor, cause the processor to perform a method, including receiving input from a mirror assembly; receiving input from a head position sensor; and adjusting the mirror assembly, based on the input from the mirror assembly and the input from the head position sensor, to maintain a line of sight for the driver.

V. DETAILED DESCRIPTION

In at least one embodiment, the present disclosure provides a system and method that automatically and continuously provides hands-free mirror adjustments in response to changes in head position of the driver. Changes in the head position of the driver may be caused, for example, by changes in driver pose, driver seat position, and the like. Changes in driver head position may also be caused by a change in driver. The system and method provides enhanced safety by automatically adjusting the rear view mirrors such that an optimal field of view of the driver is maintained without requiring action such as, for example, manual input or adjustment by the driver. The system and method also minimizes effects of improper user adjustment by automatically adjusting the rear view mirrors based on the position of the head of the driver.

While embodiments of the present technology are described herein primarily in connection with automotive vehicles, the concepts are applicable equally to any type of vehicle having adjustable mirrors. Other vehicle types include aircraft, marine craft, and motorcycles.

In at least one embodiment, the present disclosure provides continuous automatic motorized adjustment of central and/or side mirrors of a vehicle, such as an automobile, in response to changes in driver pose, e.g., head position. In at least one embodiment, the system and method utilize one or more driver monitoring device(s) to detect position of the head of the driver and then adjust alignment of the mirrors to maintain optimal driver rear view lines of sight via the mirrors. In at least one embodiment, the system and method compensates for both high rate changes and slow rate changes in driver head position by providing adjustable system parameters that stabilizes the optimal or appropriate rear view based on, for example, driver preferences, manufacturer settings, and the like. Slow rate changes may be caused by, for example, changes in driver(s) (presumably having different sizes and therefore different head positions), adjustment of seat position, and the like. Slow rate changes do not occur frequently and once studied last a long time. High rate changes are more deliberate single driver pose alterations. High rate changes may be caused by, for example, normal motion of the head during driving tasks, momentary shifts in posture such as reaching for the radio, talking with passengers, etc. High rate changes occur with high frequency and the position of the head during these changes does not last a long time.

Figure 1:
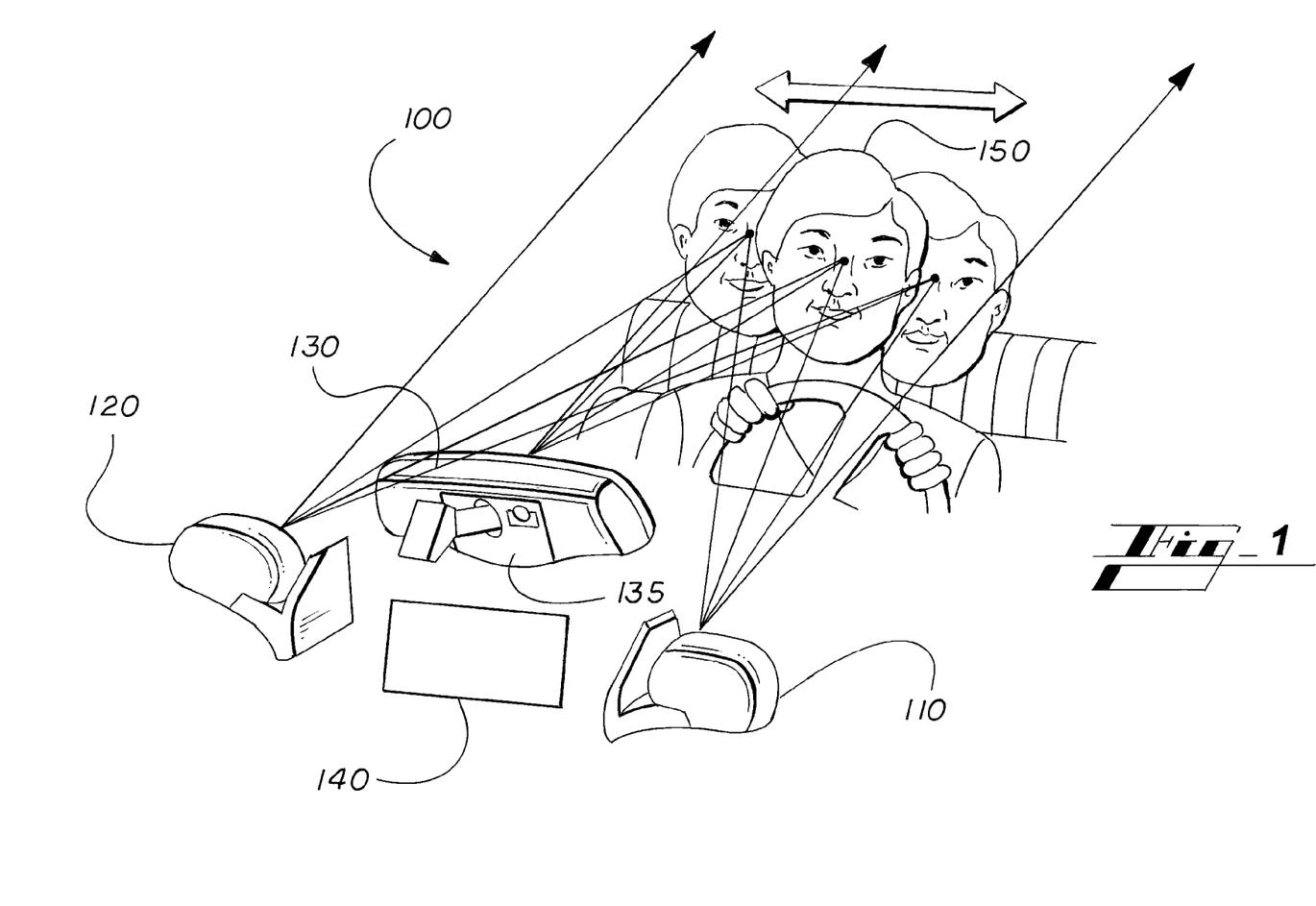
FIG. 1 illustrates a perspective view of a system in accordance with an embodiment of the present disclosure.
Figure 2:
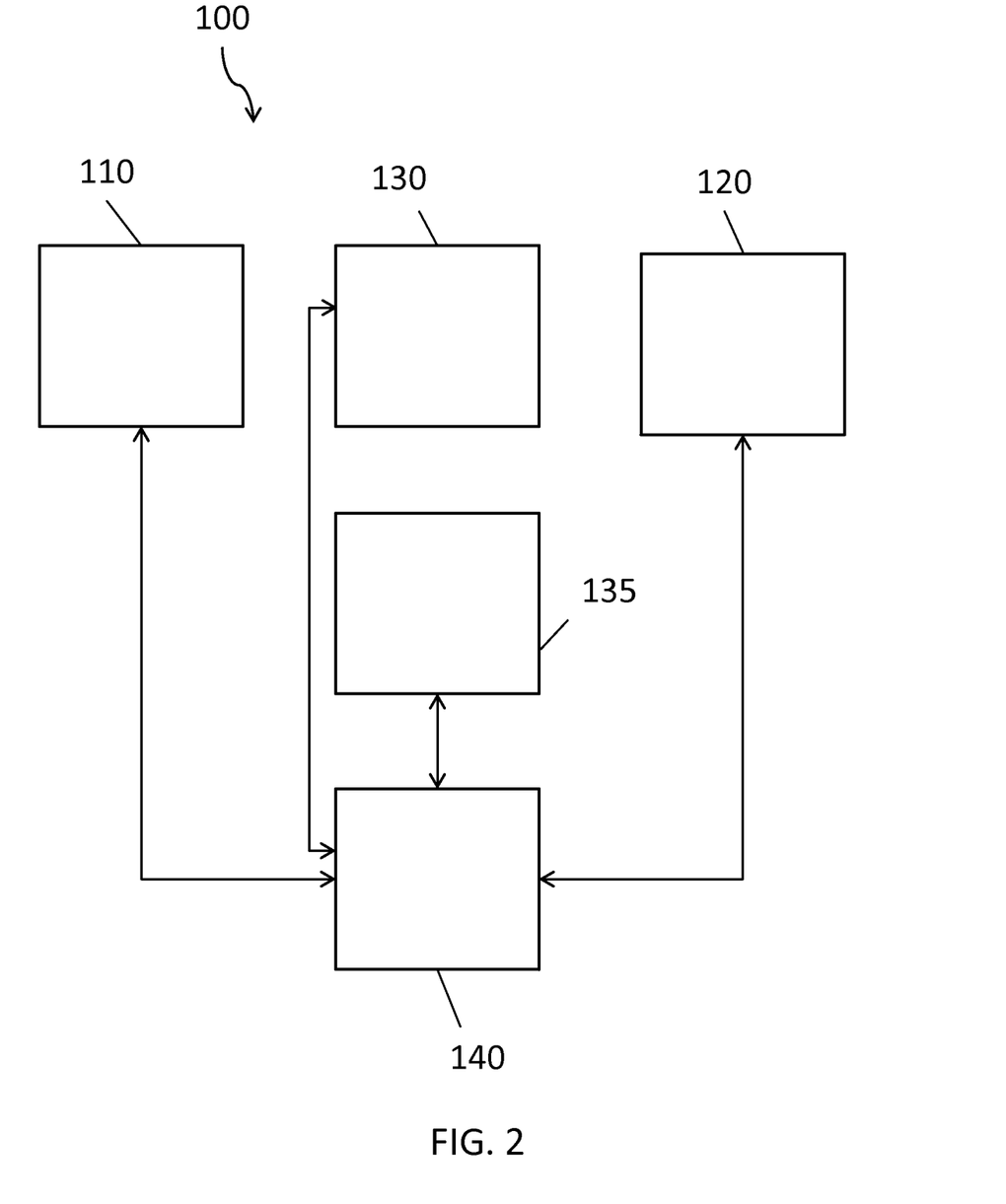
FIG. 2 illustrates a schematic view of a system in accordance with an embodiment of the present disclosure.

FIGS. 1 and 2 illustrate an automatically adjustable rear view mirror system in accordance with an embodiment of the present disclosure. The automatically adjustable rear view mirror system 100 is configured and designed for use with an automotive vehicle (not shown). The rear view mirror system 100 includes a side view mirror assembly 110, a side view mirror assembly 120, a central rear view mirror assembly 130, a driver head position sensor 135, and a master controller 140. The rear view mirror system 100 assists a driver 150 in maintaining proper lines of sight via the rear view mirrors such that the field of view is maximized. While a connection is not shown explicitly in FIG. 1, each of the side view mirror assembly 110 (driver side), the side view mirror assembly 120 (passenger side), the central rear view mirror assembly 130, and the driver head position sensor 135 are in communication with the master controller 140. While the driver head position sensor 135 is shown as a single sensor formed as part of the central rear view mirror assembly 130, other embodiments are also contemplated without departing from the present disclosure. For example, one or more head position sensor(s) 135 may be incorporated into the central rear view mirror 230, the side view mirror 110, the side view mirror 120, and/or as a stand-alone device at another suitable location within the passenger cabin. The connections can be wired and/or wireless.

In operation, the master controller 140 receives input from the side view mirror assembly 110, the side view mirror assembly 120, the central rear view mirror assembly 130, and the driver head position sensor 135. Based on the input received, the master controller 140 controls positions or angles of the side view mirror assembly 110, the side view mirror assembly 120, and the central rear view mirror assembly. The driver head position sensor 135 determines the position of the head of the driver and provides an input to the master controller 140.

The driver head position sensor may be selectively programmed to determine the head position of the driver and changes in the head position of the driver in a variety of manners. For example, the head position of the driver may be detected in order to determine an initial setting such as, for example, upon the driver entering the vehicle, starting the vehicle, or adjusting the rear view mirrors. The initial setting may be used as the appropriate rear view setting. Changes in the head position of the driver may be detected in predetermined temporal increments, such as, continuously, once every ten seconds (10 sec.), one minute (1 min.), five minutes (5 mins.), etc., or upon the occurrence of an event such as, for example, adjustment of the driver seat, manual adjustment of a rear view mirror, and the like. The changes in the head position of the driver are based on the initial setting for the head position. In at least one embodiment, the system and method of the present disclosure uses the initial setting for the head position and changes in head position to automatically adjust the rear view mirror system to maintain an appropriate field of view.

Figure 3:
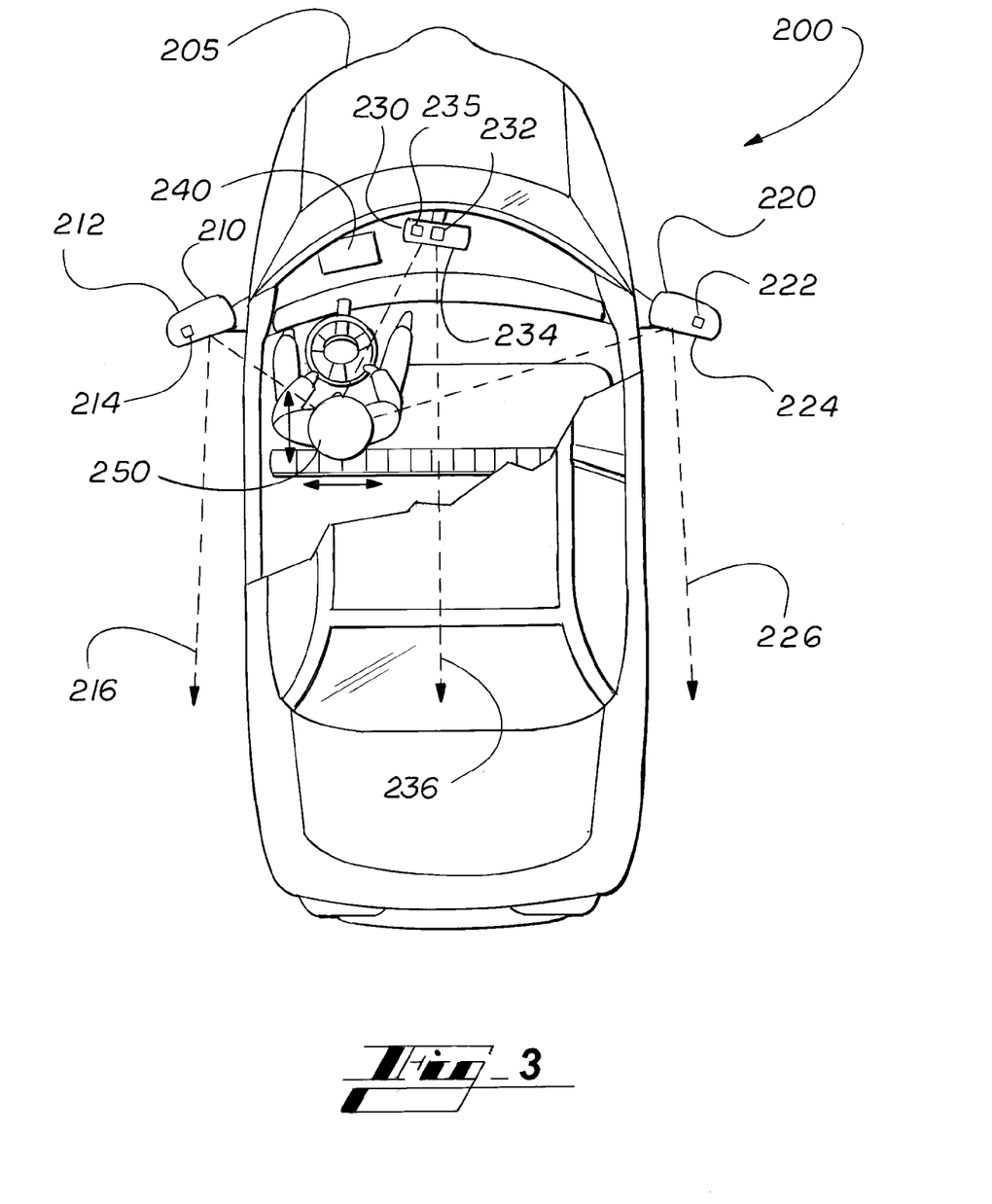
FIG. 3 illustrates a plan view of a system in accordance with an embodiment of the disclosure.

FIG. 3 provides another view of the system of the present disclosure. The automatically adjustable rear view mirror system 200 is compatible with a vehicle 205. The rear view mirror system 200 includes a side view mirror assembly 210, a side view mirror assembly 220, a central rear view mirror assembly 230, a driver head position sensor 235, and a master controller 240. The rear view mirror system 200 allows maintenance of appropriate rear lines of sight 216, 226, 236 for a driver 250 using the mirror assemblies 210, 220, and 230, respectively.

The side view mirror assembly 210 (driver side) includes a motor 212 and a reflective element 214 such as a mirror. Side view mirror assembly 220 (passenger side) includes a motor 222 and a reflective element 224 such as a mirror. The motors 212, 224 are used to adjust the angle of and thereby the view provided by the reflective elements 214, 224, respectively. The central rear view mirror assembly 230 includes a motor 232 and a reflective element 234 such as a mirror. The motor 232 is used to adjust the angle of and thereby the view provided by the reflective element 234. The driver head position sensor 235 is in one embodiment located on the central rear view mirror 230 and in other embodiments is located at other suitable location(s) within the passenger compartment that allow the sensor 235 to sense the head of the driver without obstruction, e.g., on the windshield, dashboard, headliner, or the like.

In some embodiments, each of the mirror assemblies 210, 220, and/or 230 may be manually adjusted by a mirror position switch (not shown). A manual mirror position switch (now shown) such as, for example, a four-way rocker or joystick controller, allows a driver to adjust the rear view mirrors 210, 220, 230 to an appropriate or preferred lines of sight. The master controller 240 includes a processor (not shown) and a memory mechanism (not shown). The processor includes a non-transitory computer-readable medium that stores computer-executable instructions that, when executed by a processor, cause the processor to adjust the mirror assemblies in accordance with the disclosure herein. The memory may also store other information including, for example, the mirror angle and other pre-selected settings. The system 200 detects the appropriate or preferred lines of sight and uses the mirror angles as an initial setting. The system may detect the initial setting in a variety of manners such as, for example, based upon the occurrence of an event or driver input. The occurrence of an event may include, for example, the driver entering the vehicle, adjusting the mirrors, adjusting the seat, and the like. The system detects changes in driver head position that affect or might cause the driver to lose one or more of the appropriate lines of sight based on the initial setting(s) of the mirror angles, determines one or more adjustments needed for one or more of the mirrors to maintain the appropriate lines of sight, and adjusts the one or more mirrors, as required, to maintain the lines of sight.

In at least some embodiments, the system 200 monitors a plurality of variables that may affect the head position of the driver and thereby the lines of sight of the driver. These variables include the head position of the driver and the angle of each mirror 210, 220, 230. Changes in these variables may be caused by, for example, changes in driver posture, changes in driver, changes in driver setting(s), e.g., adjustment of a mirror, adjustment of the driver seat, etc. In at least some embodiments, the system 200 considers one or more of the plurality of variables to determine if and to what degree the mirror assemblies 210, 220, 230 should be adjusted in order to maintain the optimal lines of sight 216, 226, 236, as discussed more thoroughly below. In at least some embodiments, the system 200 continuously monitors the plurality of variables to determine if and to what degree the mirror assemblies 210, 220, 230 should be adjusted and automatically makes the adjustments necessary to maintain the optimal lines of sight 216, 226, 236.

The master controller 240 is arranged to be in communication with and receives input from each of the side view mirror assembly 210, the side view mirror assembly 220, the central rear view mirror assembly 230, and the driver head position sensor 235. Channels of communication are not shown expressly, but can be wired and/or wireless. Based on the inputs received, the master controller 240 determines whether and to what degree each of the mirror assemblies 210, 220, 230 should be adjusted in order to maintain the desired lines of sight 216, 226, 236, as discussed more thoroughly below.

In at least some embodiments, the system 200 is configured to be controlled, set, or adjusted by the user in various ways including those described herein. The system 200 can also be turned on and off by the user. Turning the system on and off allows the automatic adjustment of the mirrors to be enabled and disabled by the user. In one embodiment, the system 200 provides multiple line of sight selection settings including, for example, driver-preferred (pre-selected by driver), system-suggested (determined by system), and temporal (degree of responsiveness). The line of sight selections may be stored in and retrieved from master controller 240. Storing the line of sight selections allow for the quick retrieval of pre-selected information thereby improving user efficiency and enhancing system safety.

The driver-preferred line of sight setting allows the driver to pre-select a preferred line of sight for each mirror. In one embodiment, the system is configured to receive the pre-selection via a user-vehicle interface such as a manual control. The system then maintains the preferred line of sight pre-selected by the driver even as the position of the head of the driver changes.

The system-suggested line of sight setting allows the system to determine and suggest a line of sight (e.g., what the system determines might be an ideal line of sight fostering a best field of view for the driver) to the driver. In at least some embodiments, the ideal line of sight might vary in accordance to driving conditions, e.g., speed, urban/freeway, weather, time of day, car load, position or direction (to prevent sun reflections), etc. The system may determine the ideal line of sight using these parameters and maintain that line of sight based on the head position of the driver. In at least some embodiments, the system adopts the suggested line of sight upon receiving an input from the driver indicating acceptance of the suggested line of sight. In one or more contemplated embodiments, the system adopts the line of sight, following determining it, without suggesting it to the driver and/or receiving input accepting it. Once the system adopts the suggested line of sight, the system then maintains the system-suggested line of sight setting even as the position of the head of the driver changes.

The temporal setting allows the driver to select a temporal filter time constant in order to control the responsiveness of the system to short term variations, e.g., how quickly the system makes adjustments based on changes in driver head position. The temporal settings may also be controlled by the system based on various parameters including, for example, driving conditions. Numerous time filtering parameters may be employed to determine system responsiveness. Example time filtering parameters include (A) sliding window averaging—e.g., slow adjustments based on temporal monitoring such as five minute temporal monitoring; (B) a driver pre-selected time filtering based on driver preferences, such as performing filtering at a higher frequency during the few minutes of driving, performing filtering at set milestones (miles, time, distance, etc.); (C) manufacturer presets such as settings based on standards; and (D) a driving-condition time filtering based on environmental or driving conditions, e.g., performing filtering at a higher frequency during certain conditions such as low visibility, rainy conditions, snowy conditions, rural driving, urban driving, heavy traffic, and/or the like.

Figure 4:
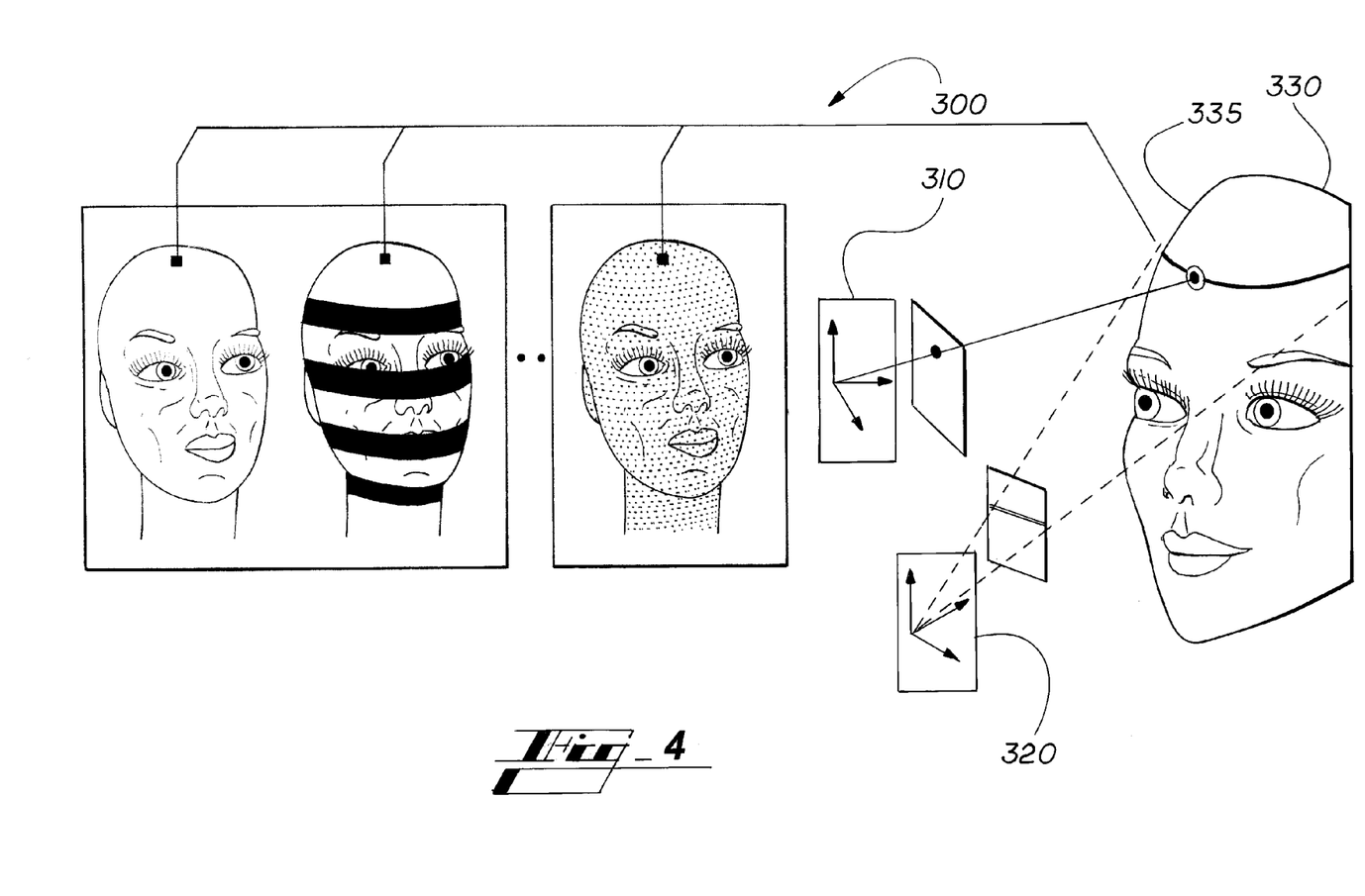
FIG. 4 illustrates an overview of driver head position devices suitable for use with a system in accordance with at least one embodiment of the present disclosure.

FIG. 4 illustrates examples of driver head position sensors suitable for use with a system in accordance with at least one embodiment of the present disclosure, such as the embodiments illustrated in and described in connection with FIGS. 1-3. The driver head position sensor 300 may employ various technologies including a camera 310 and/or projector 320 that determine the position of the head 330 of a driver such that the line of sight of the driver can be determined. In some embodiments, determining the position of the head of the driver includes determining, particularly, a position of a center 335 of the head 330 of the driver.

The driver head position sensor 300 may use three-dimensional (3D) imaging and the like. Exemplary technology for the driver head position sensor 300 include various models of the SmartEye automatic recognition systems, e.g., sensor model SP1052/01, manufactured by SmartEye Corporation of Rochester Hills, Mich., and various models of the Prime-Sense natural interaction systems manufactured by Prime-Sense of Tel-Aviv, Israel.

Input methods for determining the head position of the driver, other than three-dimensional imaging, include, for example, (I) two internal cameras mounted at an offset with respect to each other to estimate the three-dimensional (3D) position of the head of the driver; (II) structured light sensor(s); (III) a single camera that employs advanced facial pose estimation algorithms and driver specific eye distance calibration; (IV) a mirror (central and/or side) that incorporates an internally mounted camera that needs only to detect the line of sight of the driver; and (V) two (or more) separate modules of the same sensor that allow for triangulation to determine the position of the head of the driver.

Figure 5:
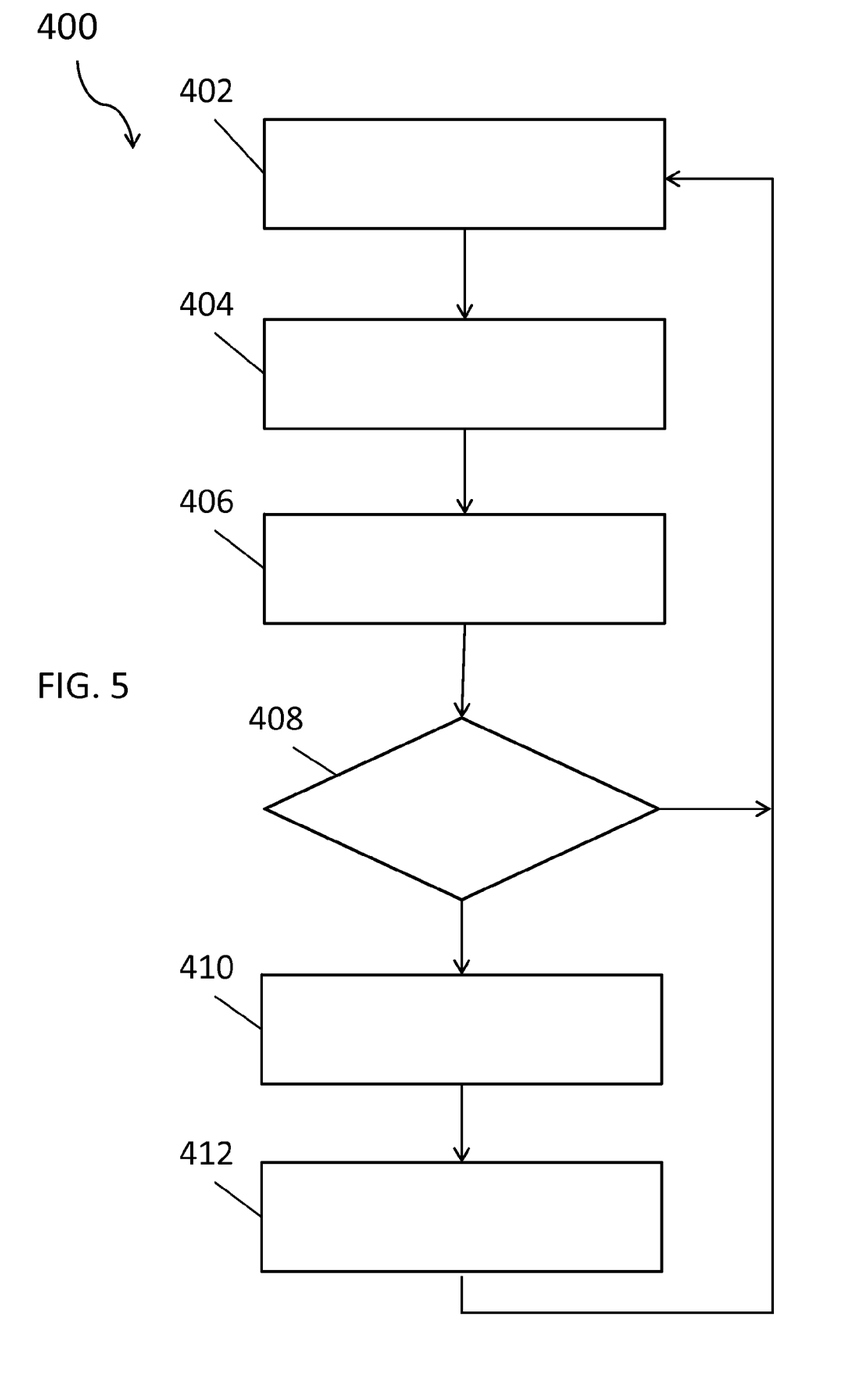
FIG. 5 illustrates a method in accordance with an embodiment of the present disclosure.

FIG. 5 illustrates a method 400 in accordance with an embodiment of the present disclosure. It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated method 400 can be ended at any time. In certain embodiments, some or all steps of this process, and/or substantially equivalent steps are performed by a system, such as the systems described herein, or more particularly by processor, such as a processor described herein, executing computer-readable instructions stored or included on a non-transitory computer readable storage medium.

At 402, the system receives input from the driver head position sensor, mirrors, and/or other inputs. At 404, the system determines the position of the head of the driver. At 406, the system determines the appropriate line of sight for the driver—e.g., system-suggested, driver-preferred, etc.

At 408, the system determines whether the angle of the mirrors require adjustment in order to obtain or maintain the appropriate line of sight. The mirrors may require adjustment due to changes in driver head position, changes in driver seat position, changes in driver, adjustment of other mirrors, and the like.

If the system determines that the adjustment is not needed, the method returns to 402. If the system determines that adjustment is needed, flow proceeds to 410 whereat the system adjusts the mirrors based on the determined appropriate line of sight.

At 412, the system updates the mirror angle information. The system then returns to 402 to automatically adjust the angle of the mirror(s) as required to maintain the line of sight based on the head position of the driver. The processing of determining whether to adjust one or more of the mirror is in some cases performed substantially continuously—e.g., on an ongoing basis, at least while the vehicle is being operated.

Figure 6:
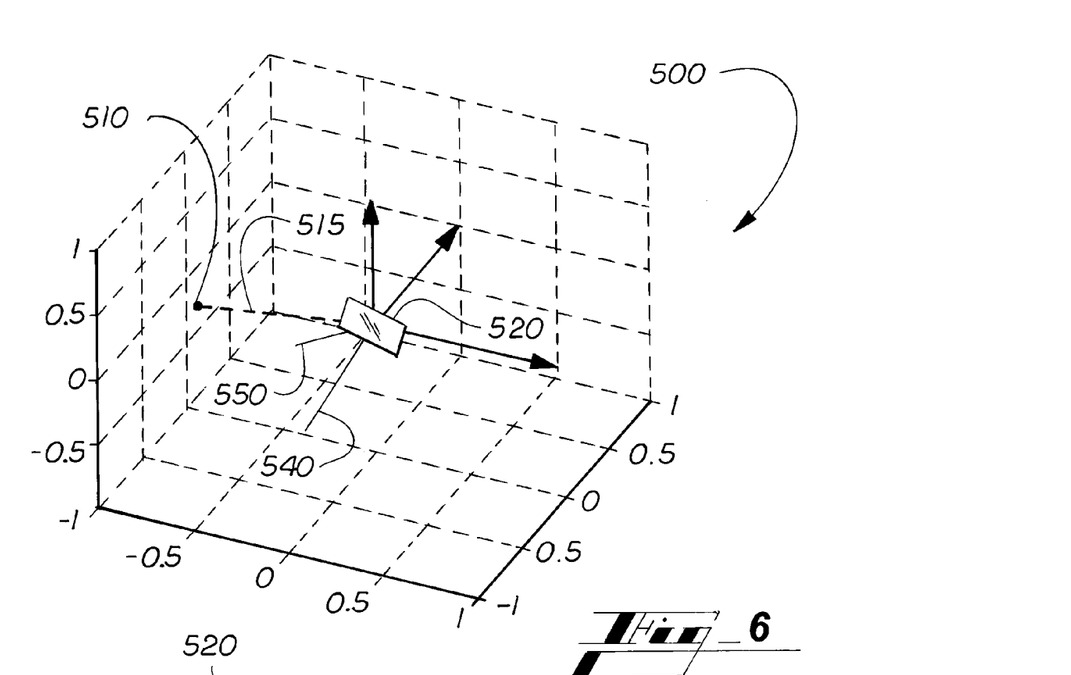
FIG. 6 illustrates vectors and angles utilized to determine the proper line of sight in accordance with at least one embodiment of the present disclosure.
Figure 7:
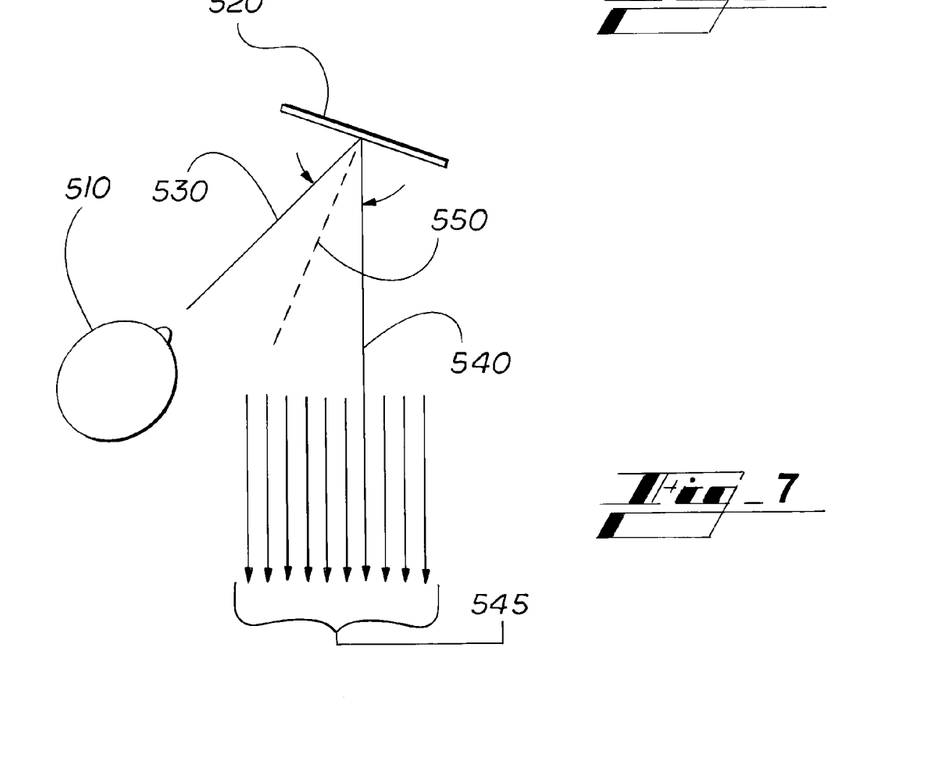
FIG. 7 illustrates an overhead view of the vectors and angles utilized to determine a proper line of sight in accordance with at least one embodiment of the present disclosure.

FIGS. 6 and 7 illustrate examples of vectors and angles used to determine the proper line of sight for the driver, in accordance with at least one embodiment of the present disclosure. FIG. 6 depicts a three-dimensional (3-D) Cartesian coordinate system 500 including examples of vectors X, Y, Z that are utilized to adjust the mirrors in accordance with at least one embodiment of the present disclosure. It is noted that all three of vectors X, Y, Z are all in the same plane. FIG. 7 depicts a two-dimensional (2-D) overhead view of the system 500, as shown in FIG. 6.

The present technology uses one or more algorithms to compute mirror angles based on the head position of the driver and a desired line-of-sight. The system of the present disclosure identifies the position of the head 510 of driver with respect to a mirror 520, such as a central rear view mirror, to determine a desired line of sight (LOS) 540 having a field of view 545. A head line 515 is defined by an unobstructed straight line-of-sight that travels from the center of the head 510 of driver to the center of the mirror 520. The system then aligns the mirror 520 such that a normal 550 bisects the angle between the head 510 and the desired line-of-sight 540 of the driver.

The master controller 140, 240 of the system of the present disclosure utilizes the above-described vectors and angles to automatically adjust the mirrors of a vehicle. The master controller uses equations to calculate the desired line of sight 540 based on a geometric relationship between the mirror 520 and the position of the head 510 of the driver. The system uses the equations to determine a momentary optimal azimuth and to determine a momentary elevation angle. Based on these determinations, the system can accurately adjust the mirror 520 to maintain the desired line of sight 540, as described above. In maintaining the line of sight 540 of the mirror, the master controller 140, 240 sends a signal to the motor of the mirror instructing the motor to adjust the mirror such that an appropriate angle is formed between the head of the driver, the mirror and the desired line of sight.

The following example equations and calculations may be used to determine the momentary optimal azimuth and elevation angle of the mirror. In at least one embodiment, the three-dimensional (3-D) position of the center of the mirror 520 and head 510 of driver are input into the system. In at least one embodiment, the center of the mirror 520 is located at the origin of coordinate system 500, i.e., (x=0, y=0, z=0). The position of the head 510 is given by the following triplet:

$$\vec{H} = (H_x, H_y, H_z)$$

The position of the head 510 may be indicated in units of distance, e.g., in meters. The desired line-of-sight (LOS) is in some embodiments given by polar angles theta $\theta$ and phi $\phi$, which represent, respectively, an angle to the x-y plane and an angle of a projection in x-y plane. Here, if X and Y are horizontal and Z is vertical, then $L_\theta$ represents elevation and $L_\phi$ represents azimuth.

The mirror angles may then be calculated by determining unit vectors in the direction of the line-of-sight (LOS) 540 and the direction of the head 510 of the driver. A unit vector in the direction of LOS is defined by the following:

$$\hat{L} = (\cos L_\theta \cos L_\phi, \cos L_\theta \sin L_\phi, \sin L_\theta) \quad (1)$$

A unit vector in the direction of the head is defined by the following:

$$\hat{H} = (H_x, H_y, H_z)/\|\vec{H}\| \quad (2)$$

The normal unit vector to the mirror is then given by the following:

$$\hat{M} = (\hat{L} + \hat{H})/\|\hat{L} + \hat{H}\| \quad (3)$$

Based on the above provided calculations, the mirror elevation and azimuth is extracted from the components of $\hat{M}$ by the following:

$$M_\theta = \sin^{-1} M_z \quad (4)$$

$$M_\varphi = \tan^{-1}\left(\frac{M_\varphi}{a_z}\right) \quad (5)$$

The system automatically and, in some cases, continuously, adjusts the mirror 520 based on the above calculations including the mirror elevation and azimuth in order to maintain a desired line-of-sight 540 providing a full field of view (FOV) 545. The adjustment of the mirror 520 is preferably performed utilizing a filtering technique, e.g., temporal low pass filtering, that smoothes out any fast short-term jittering of the mirror during adjustment. Example benefits of such filtering include making the adjustments less perceptible by the driver, thereby preventing driver discomfort from rapid mirror adjustment. The level of smoothing may also be tunable, such as by the manufacturer or driver, to best suit the needs of the user.

There are many methods of providing temporal smoothing in order to prevent jitter. One method is to utilize infinite impulse response filtering. In this method, the following inputs are utilized: the momentary optimal mirror angles $M_\theta$ and $M_\varphi$, and a small parameter controlling time constant $\alpha$.

The actual angles to set corresponding smoothing angles $\bar{M}_\theta$ and $\vec{M}_\phi$ are provided by iterating the current momentary optimal angles with the previously set angles, as follows:

$$\vec{M}_\theta = (1-\alpha)\vec{M}_\theta + \alpha M_\theta \qquad (6)$$

$$\vec{M}_\phi = (1-\alpha)\vec{M}_\phi + \alpha M_\phi \qquad (7)$$

The constant α together with the sampling rate determines the temporal smoothness of the set angles.

The above is provided as an example for determining the optimal azimuth and elevation angle of the mirror. Other examples may be used without departing from the disclosure. For example, while the present example determines the three-dimensional (3-D) position of the head of the driver, other embodiments may include, for example, determining the angular direction of the head of the driver.

While illustrated and discussed as a separate component, the master controller 140 may also be integrated with or substituted by the onboard computer system of the vehicle. While the present disclosure has been described in terms of particular preferred and alternative embodiments, it is not limited to those embodiments. Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

We claim:

1. An automatically-adjusting mirror system, for use in a vehicle, comprising:
    a mirror assembly;
    a head position sensor configured and arranged to detect poses of a head of a vehicle driver; and
    a controller comprising a processor and a computer-readable medium having computer-executable instructions that, when executed by the processor, cause the processor to perform operations comprising:
        receiving, from the head position sensor, initial data indicating an initial pose of the head of the driver;
        receiving, from the head position sensor, subsequent data indicating a new pose of the head of the driver;
        determining, using the initial data indicating the initial pose of the head of the driver and the subsequent data indicating the new pose of the head of the driver, a change in driver head position;
        generating, based on the change in driver head position determined, a mirror-assembly-control signal to command adjustment of the mirror assembly for maintaining a line of sight for the driver; and
        sending, to the mirror assembly, the mirror-assembly-control signal to maintain the line of sight for the driver.

2. The system according to claim 1, wherein the operations further comprise determining the line of sight based on input received from the driver.

3. The system according to claim 1, wherein the operations further comprise suggesting the line of sight to the driver.

4. A method, for adjusting components of a mirror assembly of a vehicle based on driver pose, comprising:
    receiving, from a head position sensor of the vehicle, initial data indicating an initial pose of the head of a driver of the vehicle;
    receiving, from the head position sensor, subsequent data indicating a new pose of the head of the driver;
    determining, using the initial data indicating the initial pose of the head of the driver and the subsequent data indicating the new pose of the head of the driver, a change in driver head position;
    generating, based on the change in driver head position determined, a mirror-assembly-control signal to command adjustment of the mirror assembly for maintaining a line of sight for the driver; and
    sending, to the mirror assembly, the mirror-assembly-control signal to maintain the line of sight for the driver.

5. The method according to claim 4, further comprising determining the line of sight based on input received from the driver.

6. The method according to claim 4, further comprising suggesting the line of sight to the driver.

7. A computer-readable storage device having stored thereon computer-executable instructions that, when executed by a processor, cause the processor to perform operations, for adjusting a mirror assembly of a vehicle based on driver pose, comprising:
    receiving, from a head position sensor of the vehicle, initial data indicating an initial pose of a head of a driver of the vehicle;
    receiving, input from the head position sensor, subsequent data indicating a new pose of the head of the driver;
    determining, using the initial data indicating the initial pose of the head of the driver and the subsequent data indicating the new pose of the head of the driver, a change in driver head position;
    generating, based on the change in driver head position determined, a mirror-assembly-control signal to command adjustment of the mirror assembly for maintaining a line of sight for the driver; and
    sending, to the mirror assembly, the mirror-assembly-control signal to maintain the line of sight for the driver.

8. The computer-readable storage device according to claim 7, wherein the operations further comprise determining the line of sight based on input received from the driver.

9. The computer-readable storage device according to claim 7, wherein the operations further comprise suggesting the line of sight to the driver.

10. The system according to claim 1, wherein:
    the head position sensor is configured and arranged to detect the head poses using three-dimensional imaging;
    the initial data received from the head position sensor includes initial three-dimensional image data;
    the subsequent data received from the head position sensor includes subsequent three-dimensional image data; and
    the operation of determining the change in driver head position is performed using the initial three-dimensional image data and the subsequent three-dimensional image data.

11. The system according to claim 1, wherein the head position sensor is, for operation of the system, positioned at one or more locations, of a passenger compartment of the vehicle, selected from a group consisting of:
    a mirror of the mirror assembly;
    a windshield of the vehicle;
    a dashboard of the vehicle; and
    a headliner of the vehicle.

12. The system according to claim 1, wherein:
the line of sight is variable; and
the operations comprise determining the line of sight based on at least one driving condition selected from a group consisting of:
vehicle speed;
whether the vehicle is being operated under freeway conditions;
weather;
time of day;
vehicle load;
vehicle position; and
vehicle direction.

13. The system according to claim 1, wherein:
the head position sensor is configured and arranged to, in detecting the head poses, determine locations of a central point, laterally between eyes, of the head of the driver;
the initial data received from the head position sensor indicates an initial location of the central point of the head of the driver;
the subsequent data received from the head position sensor indicates a new location of the central point of the head of the driver; and
the operation of determining the change in driver head position is performed using the initial data indicating the initial location of the central point and the subsequent data indicating the new location of the point.

14. The method according to claim 4, wherein:
the head position sensor is configured and arranged to detect the head poses using three-dimensional imaging;
the initial data received from the head position sensor includes initial three-dimensional image data;
the subsequent data received from the head position sensor includes subsequent three-dimensional image data; and
determining the change in driver head position is performed using the initial three-dimensional image data and the subsequent three-dimensional image data.

15. The method according to claim 4, wherein the data received from the head position sensor indicates image information based on an image sensor vantage selected from a group consisting of:
a mirror of the mirror assembly;
a windshield of the vehicle in which the sensor is located during performance of the method;
a dashboard of the vehicle; and
a headliner of the vehicle.

16. The method according to claim 4, wherein:
the line of sight is variable; and
the method further comprises determining the line of sight based on at least one driving condition selected from a group consisting of:
vehicle speed;
whether the vehicle is being operated under freeway conditions;
weather;
time of day;
vehicle load;
vehicle position; and
vehicle direction.

17. The method according to claim 4, wherein:
the head position sensor is configured and arranged to detect locations of a central point, laterally between eyes, of the head of the driver;
the initial data received from the head position sensor indicates an initial location of the central point of the head of the driver;
the subsequent data received from the head position sensor indicates a new location of the central point of the head of the driver; and
determining the change in driver head position is performed using the initial data indicating the initial location of the central point and the subsequent data indicating the new location of the point.

18. The computer-readable storage device according to claim 7, wherein:
the head position sensor is configured and arranged to detect the head poses using three-dimensional imaging;
the initial data received from the head position sensor includes initial three-dimensional image data;
the subsequent data received from the head position sensor includes subsequent three-dimensional image data; and
the operation of determining the change in driver head position is performed using the initial three-dimensional image data and the subsequent three-dimensional image data.

19. The computer-readable storage device according to claim 7, wherein the data received from the head position sensor indicates image information based on an image sensor vantage selected from a group consisting of:
a mirror of the mirror assembly;
a windshield of the vehicle in which the sensor is located during operation of the storage device;
a dashboard of the vehicle; and
a headliner of the vehicle.

20. The computer-readable storage device according to claim 7, wherein:
the line of sight is variable; and
the operations comprise determining the line of sight based on at least one driving condition selected from a group consisting of:
vehicle speed;
whether the vehicle is being operated under freeway conditions;
weather;
time of day;
vehicle load;
vehicle position; and
vehicle direction.

21. The computer-readable storage device according to claim 7, wherein:
the head position sensor is configured and arranged to detect locations of a central point, laterally between eyes, of the head of the driver;
the initial data received from the head position sensor indicates an initial location of the central point of the head of the driver;
the subsequent data received from the head position sensor indicates a new location of the central point of the head of the driver; and
the operation of determining the change in driver head position is performed using the initial data indicating the initial location of the central point and the subsequent data indicating the new location of the point.

* * * * *